(12) United States Patent
Tanaka et al.

(10) Patent No.: US 8,570,240 B2
(45) Date of Patent: Oct. 29, 2013

(54) COMMUNICATION SHEET STRUCTURE

(75) Inventors: Akira Tanaka, Osaka (JP); Machiko Oouchida, Ibaraki (JP); Hiroyuki Mori, Ibaraki (JP)

(73) Assignee: Teijin Fibers Limited, Osaka (JP)

( * ) Notice: Subject to any disclaimer, the term of this patent is extended or adjusted under 35 U.S.C. 154(b) by 340 days.

(21) Appl. No.: 12/996,839

(22) PCT Filed: Jun. 27, 2008

(86) PCT No.: PCT/JP2008/062114
§ 371 (c)(1),
(2), (4) Date: Dec. 8, 2010

(87) PCT Pub. No.: WO2009/157095
PCT Pub. Date: Dec. 30, 2009

(65) Prior Publication Data
US 2011/0084890 A1     Apr. 14, 2011

(51) Int. Cl.
*H01Q 1/36* (2006.01)
(52) U.S. Cl.
USPC .......................................... 343/897; 343/872
(58) Field of Classification Search
USPC .................................. 343/700 MS, 872, 897
See application file for complete search history.

(56) References Cited

U.S. PATENT DOCUMENTS

| | | | | |
|---|---|---|---|---|
| 4,092,453 | A * | 5/1978 | Jonda | 442/185 |
| 7,245,269 | B2 * | 7/2007 | Sievenpiper et al. | 343/909 |
| 7,855,689 | B2 * | 12/2010 | Fukui et al. | 343/731 |
| 8,134,505 | B2 * | 3/2012 | Yamagajo et al. | 343/700 MS |
| 2007/0069971 | A1 * | 3/2007 | Horikoshi et al. | 343/897 |
| 2007/0117520 | A1 | 5/2007 | Asamura et al. | |
| 2009/0051620 | A1 * | 2/2009 | Ishibashi et al. | 343/897 |

FOREIGN PATENT DOCUMENTS

| | | |
|---|---|---|
| JP | 2002-26568 A | 12/2002 |
| JP | 2004-007448 A | 1/2004 |
| JP | 2005-057401 A | 3/2005 |
| JP | 2005-322052 A | 11/2005 |
| JP | 2006-019979 A | 1/2006 |
| JP | 2006-229641 A | 8/2006 |
| JP | 2006229196 A | 8/2006 |
| JP | 2006-270165 A | 10/2006 |
| JP | 2007150654 A | 6/2007 |
| JP | 2007281678 A | 10/2007 |
| JP | 2008111218 A | 5/2008 |

OTHER PUBLICATIONS

H. Shinoda, "Sozai Hyomen ni Keisei suru Kosoku Sensor Network", Journal of the Society of Instrument and Control Engineers, Feb. 10, 2007, vol. 46, No. 2, pp. 98-103.

(Continued)

*Primary Examiner* — Tan Ho
(74) *Attorney, Agent, or Firm* — Sughrue Mion, PLLC (57) ABSTRACT

A communication sheet structure for transmitting electromagnetic waves, and thereby performing communication, is characterized in that the communication sheet structure includes a planar base material with a relative dielectric constant at a frequency of from 800 MHz to 10 GHz of from 1.0 to 15.0, and one side of the base material includes conductor A existing portion and non-existing portion, and the other side of the base material includes a conductor B existing over 90% or more thereof. The communication sheet structure enables communication in two dimensions, and the communication sheet structure is extremely excellent in communication performances.

11 Claims, 3 Drawing Sheets

Conductor A

Portion having conductive performance (56) References Cited

OTHER PUBLICATIONS

Yasutoshi et al., Proximity Connector for Two-Dimensional Electromagnetic Wave Communication, Proc Sens Symp Sens Micromachines Appl Syst, (Oct. 5, 2006), vol. 23. p. 397-402.

Yusutoshi et al., Sensor Networking Using Two-Dimensional Electromagnetic Wave, Proc Sens Symp Sens Micromachines Appl Syst, (Oct. 20, 2005), vol. 22, p. 83-88.

Japanese Office Action, dated Oct. 30, 2012, issued in corresponding Japanese Application No. 2010-517654.

* cited by examiner

FIG. 1
Conductor A

Portion having conductive performance

FIG. 2
Conductor A

Portion having conductive performance

FIG. 3
Conductor A

FIG. 4
Conductor A

FIG. 5
Conductor A

FIG. 6
Conductor A

FIG. 7
Conductor A

FIG. 8

COMMUNICATION SHEET STRUCTURE

TECHNICAL FIELD

The present invention relates to a communication sheet for performing communication by transmitting electromagnetic waves. More particularly, it relates to a communication sheet structure having two-dimensional expansion, optimum for, by contact or proximity of information communication devices with or to the surface thereof, performing communication with the communication devices, or for, in the case where a plurality of information communication devices are in contact with or in proximity to the surface thereof, relaying communication therebetween.

BACKGROUND ART

In recent years, use of computer communication networks or information networks represented by the Internet, has come into wide and popular use, and has been increasing without distinction among ordinary households, enterprises, and the like. The most common use form is such that personal computers and the like are directly connected with LAN cables, or connected by way of wireless to establish a LAN (Local Area Network), which allows access from the computers in the LAN to a network such as the Internet. In such circumstances, when a LAN cable is used, the cable is routed in a house or an office, causing an obstruction to walking or an appearance problem. Whereas, when wireless LAN is used, communication is performed using radiation of electric waves, which causes security problems such as information leakage and an unauthorized access.

Under such circumstances, the fact that these problems can be solved by making communication means two-dimensional, and using a two-dimensional communication medium is shown in Patent Document 1 (JP-A-2004-7448) and Patent Document 2 (JP-A-2006-19979).

Whereas, in recent years, office security has received attention, so that information networks of an office environment have been upgraded. In a conference room or a discussion space, prevention of information leakage has become valued, creating a demand for space with high security in an office. On the other hand, a free-address office also has attracted great attention. One can hold one's access environment even upon moving, which enables control of the individual ID, and acquisition/control/display of the positional information.

In such circumstances, setting of a communication sheet structure on a top of a desk in a conference room or one's own room in an office is largely useful for construction of an office network.

Other than these, there are ideas in which RFID tags and this communication sheet structure are combined to perform inventory control and physical distribution management; and in which this communication medium is set over the entire wall surface or the entire floor surface for use as a sensor sheet.

Such ideas of use in combination with RFID tags, and use in the form with a larger area such as the wall entire surface or the floor entire surface require further enhancement of the transmission efficiency of the communication medium, and improvement of the communication performances. Further, there is a demand for a communication medium with higher durability from the viewpoint of practical utility.

On the other hand, for the foregoing uses, being handy to carry is desirable in consideration of the convenience of a constructor and a user. Particularly, the communication medium to be set over the entire wall surface or the entire floor surface increases in area as described above. Therefore, it is required to be carried or stored in the rolled form. However, with the conventionally proposed communication media, no specific proposals have not been made on this point at all. The inventors attempted to form communication media with various materials. However, they found that there were problems such as difficulty in winding this in a roll form, becoming wrinkled upon attempting to forcedly wind this in a roll form, and reduction of communication performances.

[Patent Document 1] JP-A-2004-7448
[Patent Document 2] JP-A-2006-19979

DISCLOSURE OF THE INVENTION

Problems that the Invention is to Solve

It is a first object of the present invention to provide a communication sheet structure capable of communication in two dimensions at a frequency band of from 800 MHz to 10 GHz in frequency, and further extremely excellent in communication performances thereof. Further, it is a second object of the invention, in addition to the first object, to provide a communication sheet structure capable of being carried in a wound roll form. Still further, it is a third object, in addition to the first object, to provide a communication sheet structure excellent in durability.

Means for Solving the Problems

The present inventors conducted a study in order to solve the foregoing problems. As a result, they found that, according to the material, structure, and the like of the base material, the material or structure thereof, the communication performances are remarkably improved. Thus, the present invention provides the following inventions:

1. A communication sheet structure for transmitting electromagnetic waves, and thereby performing communication, characterized in that the communication sheet structure includes a planar base material with a relative dielectric constant at a frequency of from 800 MHz to 10 GHz of from 1.0 to 15.0, and one side of the base material includes conductor A existing portion and non-existing portion, and the other side of the base material includes a conductor B existing over 90% or more thereof.

2. The communication sheet structure according to claim 1, wherein the conductor A existing portion surrounds the conductor A non-existing portion.

3. The communication sheet structure according to claim 1, wherein the electric resistance values of the conductor A and the conductor B are 5Ω/or less.

4. The communication sheet structure according to claim 1, wherein the conductor A is disposed in a lattice.

5. The communication sheet structure according to claim 4, wherein the line width of the lattice is from 0.5 mm to 5.0 mm, and the line spacing is from 3 mm to 50 mm.

6. The communication sheet structure according to claim 1, wherein the base material includes a fiber structure.

7. The communication sheet structure according to claim 6, wherein the fiber forming the fiber structure is a modified cross-section fiber.

8. The communication sheet structure according to claim 6, wherein the fiber structure is a nonwoven fabric in which the number of fibers oriented in the thickness direction is larger than the number of fibers oriented in the planar direction.

9. The communication sheet structure according to claim 1, wherein the base material is an elastomer resin or an elastomer fiber structure.

10. The communication sheet structure according to claim 1, wherein the conductor A and the base material are covered with a protective layer A, or at least the conductor B is covered with a protective layer B.

11. The communication sheet structure according to claim 10, wherein the protective layer A or B is an elastomer resin or an elastomer fiber structure.

12. The communication sheet structure according to claim 10, wherein the protective layer A or B is a high density woven fabric with a cover factor of 1000 to 2500.

Advantage of the Invention

Use of the communication sheet structure of the present invention enables carrying of the communication sheet structure in a wound roll form, which facilitates setting on a desk for an office, and setting in the field of inventory control or physical distribution management. Further, setting of a single sheet structure over the entire wall surface or over the entire floor surface becomes possible, which is useful for development of home security.

BEST MODE FOR CARRYING OUT THE INVENTION

Below, the present invention will be described in details. It is a first object of the present invention to provide a communication sheet structure capable of communication in two dimensions at a specific frequency, and further excellent in communication performances thereof.

The communication sheet structure of the invention is a communication sheet structure for performing communication by transmitting electromagnetic waves. The communication sheet structure includes a planar base material, and has a sheet structure in which the front surface and back surface of the base material are covered with conductors A and B having a conductive performance. For performing communication in two dimensions, it is necessary to confine electromagnetic waves within the sheet medium in this sheet configuration.

In the invention, it is essential that the base material is a planar base material with a relative dielectric constant at a frequency of from 800 MHz to 10 GHz of 1.0 to 15, preferably from 1.0 to 5.0, and more preferably from 1.0 to 3.0. By using the base material having the foregoing characteristics, the communication sheet structure can reduce attenuation of electromagnetic waves transmitted in the sheet, and exerts extremely excellent two-dimensional communication performances.

The base material satisfying the foregoing conditions is preferably a sheet, a film, or a fiber structure from the viewpoint of satisfying the processability and the relative dielectric constant, and implementing even the windability described later, and the like, and among these, it is preferably a fiber structure. Herein, as the fiber structures, mention may be made of a woven fabric, a knitted fabric, a nonwoven fabric, and the like. Particularly, a woven fabric is preferable.

As the materials forming the sheet, film, and fiber structure, there can be exemplified polyesters such as polyethylene terephthalate (PET), polyethylene naphthalate (PEN), polybutylene terephthalate (PBT), and polytrimethylene terephthalate (PTT), aliphatic polyamides such as nylon 6, nylon 66, and nylon 12, aromatic polyamides such as polyparaphenylene terephthalamide and polymethaphenylene terephthalamide, polypropylene (PP), polyethylene (PE), polycarbonate (PC), and polyimide (PI).

Whereas, when a woven fabric, a knitted fabric, or a nonwoven fabric is used as the base material, the fineness of one filament is preferably from 0.5 to 30 dtex, and more preferably from 0.5 to 10 dtex. Further, when the base material is a woven fabric or a knitted fabric, it is preferable to use a multifilament yarn with a total fineness of preferably 30 to 1500 dtex, and more preferably 30 to 800 dtex. Further, when the base material is a woven fabric, the woven fabric density is preferably from 15 to 200 yarns/inch, and more preferably from 15 to 150 yarns/inch in terms of both warp density and weft density. Incidentally, the warp density and the weft density may be the same or different.

Further, when the base material includes a fiber structure, as the fibers forming this, there can also be employed, other than a round cross-section, a hollow cross-section fiber, and modified cross-section fibers of C-shaped cross-section, H-shaped cross-section, I-shaped cross-section, L-shaped cross-section, T-shaped cross-section, cross-shaped cross section, Y-shaped cross-section, triangular cross-section, square cross-section, flat cross-section, and the like. Alternatively, there can be adopted composite crimped fiber having a side by side type or eccentric core sheath type cross-section, a fiber developing crimps by anisotropic cooling in spinning, a fiber mechanically provided with crimps, and the like. This can also increase the void ratio of the base material, and enhances the transmission efficiency for improving the communication performances.

When the base material is a fiber structure, particularly a woven fabric, and a paste of a conductor A is printed on the base material surface as described later, the surface of the woven fabric is preferably coated with a resin.

Incidentally, the thickness of the base material is preferably from 0.2 mm to 10 mm, and more preferably from 0.5 mm to 2.0 mm. Whereas, the weight per unit of the base material is preferably from 50 $g/m^2$ to 800 $g/m^2$, and more preferably from 80 $g/m^2$ to 300 $g/m^2$.

It is a second object of the invention, in addition to the first object, to provide a communication sheet structure capable of being carried in a wound roll form.

In the invention, when a sheet or a film is used as the base material, an elastomer sheet is preferably adopted. This enables the communication sheet structure to be flexibly wound in a roll form.

As the resin forming the elastomer sheet or film, mention may be made of olefin type (TPO), styrene type (SBC), polyvinyl chloride type (TPVC), urethane type (PU), ester type (TPEE), amide type (TPAE), or the like. Particularly, an olefin elastomer resin satisfying the relative dielectric constant is preferable.

Further, by using a fiber structure such as a woven fabric, a knitted fabric, or a nonwoven fabric as the base material as described above, it is possible to manufacture a flexible communication sheet structure as compared with a resin or a film. However, by further adopting a fiber structure including an elastomer fiber, it is possible to manufacture a more flexible communication sheet structure. As the elastomer fiber, the one obtained by making the elastomer resin fibrous with a known method can be used. The fiber structure may be the one manufactured with a melt blow method, a spun bond method, or the like.

Further, from the same viewpoint, as described later, when a protective layer is provided on the front surface or the back surface of the base material, it is preferable to use an elastomer resin or an elastomer fiber structure for the protective layer.

In the invention, when the base material is a nonwoven fabric, it is preferably a nonwoven fabric in which the number of fibers oriented in the thickness direction is larger than the number of fibers oriented in the planar direction. When a nonwoven fabric in which a larger number of fibers are oriented in the thickness direction is thus used, upon rolling the communication sheet structure, the difference in circumference between the internal diameter and the outer diameter causes the nonwoven fabric to freely expand and contract in the horizontal direction. This can prevent occurrence of wrinkles.

One side of the base material is required to have conductor A existing portion and non-existing portion. Particularly, it is preferable that the conductor A existing portion surrounds the conductor A non-existing portion. Presence of the conductor A having such a shape on one side of the base material allows electromagnetic waves to be leaked from the conductor A non-existing portion to the outside of the sheet. This enables external communication devices in proximity to the communication sheet structure to receive electromagnetic waves.

The electric resistance value of the conductor A is preferably $5\Omega/\square$ or less, and more preferably from $0.0001\Omega/\square$ to $1\Omega/\square$. By setting the electric resistance value of the conductor A at $5\Omega/\square$ or less, it is possible to more reduce the attenuation of electromagnetic waves transmitting within the sheet, which allows favorable communication in two dimensions. For this reason, as the conductor A, a material containing gold, silver, copper, aluminum, nickel, or stainless steel is preferably used.

As a means for forming the conductor A as described above on one side of the base material, it is essential only that the conductor A is printed, plated, evaporated, or laminated. Particularly, when the one containing a metal such as copper, silver, aluminum, or nickel is plated or laminated, the metal film of the conductor A can be manufactured thickly.

Figure 1:
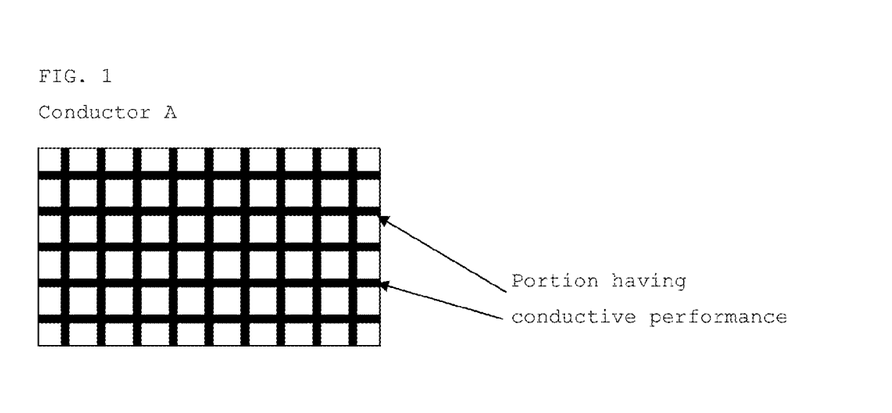
[FIG. 1] A front view of a conductor A of a communication sheet structure which is one embodiment of the present invention.
Figure 2:
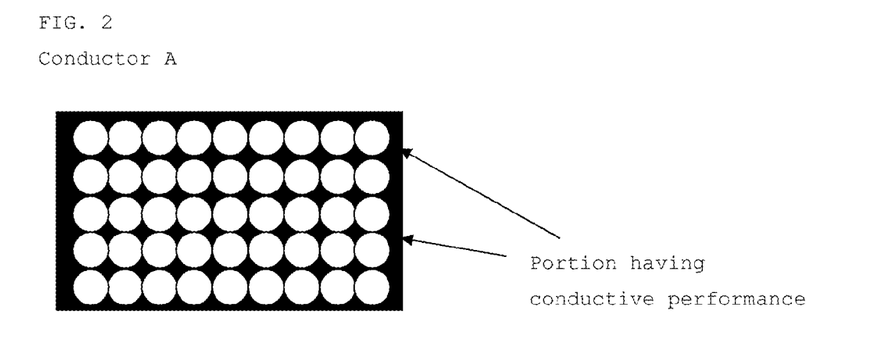
[FIG. 2] A front view of a conductor A of a communication sheet structure which is another embodiment of the invention.

As the forms in which there are conductor A existing portion and non-existing portion as described above, particularly, as the forms in which the conductor A existing portion surrounds the conductor A non-existing portion, there can be exemplified the forms shown in FIGS. 1 to 7 in consideration of the communication performances and processability. Out of these, the lattice-shaped form as shown in FIG. 1 is preferable. When the form of the conductor A is linear as shown in FIG. 1, and FIGS. 3 to 7, the line width is preferably from 0.5 mm to 1.5 mm. Further, in the case of the lattice form as shown in FIG. 1, the lattice line spacing is in particular preferably from 3 mm to 10 mm. In the invention, it is essential only that, at least partially, the conductor A existing portion surrounds the conductor A non-existing portion. For example, as shown in FIG. 1, at the end of the sheet, or the like, there may be a part in which the conductor A existing portion does not surround the conductor A non-existing portion.

Whereas, the thickness of the conductor A is preferably larger than the conductor surface skin depth corresponding to the frequency of the electromagnetic waves transmitting through the communication sheet structure. This facilitates confinement of electromagnetic waves within the communication sheet structure. The thickness of the conductor A is preferably from 0.0001 μm to 50 μm, and more preferably from 1 μm to 25 μm.

On the other hand, the other side of the base material is required to have a conductor B existing over 90% or more, and preferably 95% or more thereof. As a result of this, favorable communication conditions can be held. Further, the other side of the base material may be entirely, namely, 100%, covered with the conductor B.

The electric resistance value of the conductor B is preferably $5\Omega/\square$ or less, and more preferably from $0.001\Omega/\square$ to $3\Omega/\square$. Herein, when the electric resistance value is set at $1\Omega/\square$ or less, and the processability for communication sheet structure manufacturing is considered, as the conductor A, a material containing gold, silver, copper, aluminum, stainless steel, or nickel is preferably used.

As a means for imparting the foregoing conductive performances to the resin layer, it is essential only that a material having a conductivity is printed, plated, evaporated, or laminated. Particularly, when the one containing a metal such as copper, silver, aluminum, or nickel is plated or laminated, the metal film can be manufactured thickly.

Incidentally, the thickness of the conductor B is, in general, preferably from 0.00001 μm to 50 μm, and more preferably from 1 μm to 25 μm.

In the invention, in order to improve the durability of the communication sheet structure, it is preferable that the conductor A and the base material are covered with a protective layer A on the one side, or that at least the conductor B is covered with a protective layer B in the other side.

The protective layer A or B may be a resin, a sheet, or a film. There are included polyester films of PET, PEN, and the like, polyolefin films of PE, PP, and the like, films such as a polyimide film and an ethylene-vinyl alcohol film, and resins such as acrylic resins and urethane resins.

Further, the protective layer A or B may be a fiber structure such as a woven fabric, a knitted fabric, or a nonwoven fabric. As the resins forming the fiber, there can be exemplified polyesters such as polyethylene terephthalate (PET), polyethylene naphthalate (PEN), polybutylene terephthalate (PBT), and polytrimethylene terephthalate (PTT), aliphatic polyamides such as nylon 6, nylon 66, and nylon 12, aromatic polyamides such as polyparaphenylene terephthalamide and polymethaphenylene terephthalamide, polypropylene (PP), polyethylene (PE), polycarbonate (PC), and polyimide (PI).

As described above, an elastomer resin or an elastomer nonwoven fabric is also acceptable. Further, the protective layers A and B may be the same or different.

Further, by forming the protective layer A or B into a high density woven fabric with a cover factor of preferably 1000 to 2500, and more preferably 1000 to 2000, the smoothness of the sheet surface is improved, which can reduce the attenuation of electromagnetic waves. Herein, the cover factor is expressed as: $(D^1)^{1/2} \times N^1 + (D^2)^{1/2} \times N^2$, where the warp total fineness is $D^1$ (dtex); the warp density, $N^1$ (yarns/inch); the weft total fineness, $D^2$ (dtex); and the weft density $N^2$ (yarns/inch).

Further, from the same viewpoint, the protective layer A or B may be a woven fabric including a flat cross-section fiber.

Each thickness of the protective layers A and B is about 0.05 mm to 10 mm, and preferably 0.1 to 0.3 mm.

Thus, when the protective layer A is provided, as described above, it is acceptable that the conductor A is directly formed on the base material, and that the protective layer A is further covered from thereabove. However, it is also acceptable that the protective layer A with the conductor A formed on the side thereof to be bonded with the base material, and the base material are bonded and formed.

On the other hand, also for providing the protective layer B, it is also acceptable that the protective layer B with the conductor B formed on the side thereof to be bonded with the base material has been formed, and this and the base material are bonded to manufacture a communication sheet structure.

The weight per unit of the entire sheet in the communication sheet structure of the invention is preferably from 200 g/m² to 2500 g/m², and more preferably from 250 g/m² to 600 g/m². For the weight, it becomes difficult to implement a structure for communication at less than 200 g/m². On the other hand, when the weight exceeds 2500 g/m², the sheet is very heavy, and hence becomes difficult to carry with ease. Further, from the same viewpoint, the thickness of the whole of the communication sheet structure is preferably 0.2 to 20 mm, and preferably about 1 to 5 mm.

EXAMPLES

Below, the invention will be further described in details by way of examples. Incidentally, the physical properties in Examples and Comparative Examples were measured with the following methods.

(1) Electric Resistance Value

The electric resistance values of the conductor A and the conductor B were measured by means of "Lorester MP MCP-T350" manufactured by Mitsubishi Chemical Corporation.

(2) Relative Dielectric Constant

The relative dielectric constant at 5.2 GHz was measured with a cylindrical cavity resonator process by means of a network analyzer manufactured by Agilent Co.

(3) Communication Performance Evaluation Determination (Xav.)

Figure 3:
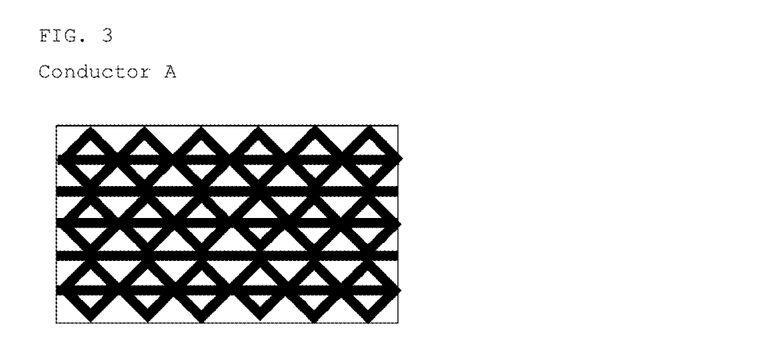
[FIG. 3] A front view of a conductor A of a communication sheet structure which is a still other embodiment of the invention.
Figure 4:
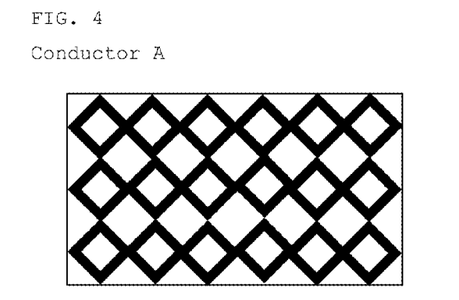
[FIG. 4] A front view of a conductor A of a communication sheet structure which is a further other embodiment of the invention.
Figure 5:
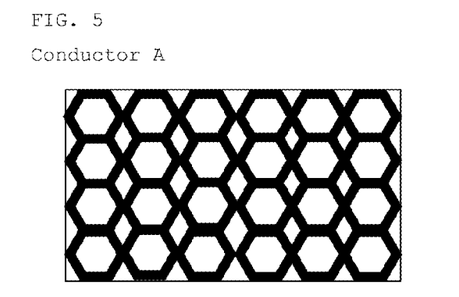
[FIG. 5] A front view of a conductor A of a communication sheet structure which is a still other embodiment of the invention.
Figure 6:
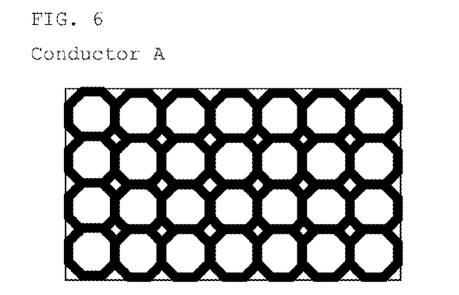
[FIG. 6] A front view of a conductor A of a communication sheet structure which is another embodiment of the invention.
Figure 7:
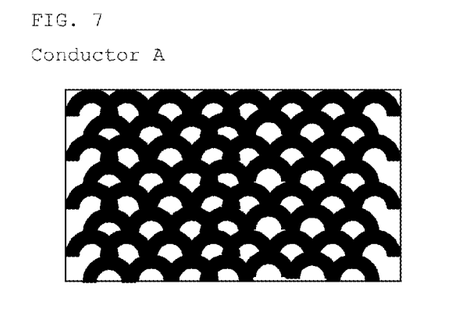
[FIG. 7] A front view of a conductor A of a communication sheet structure which is a still other embodiment of the invention.
Figure 8:
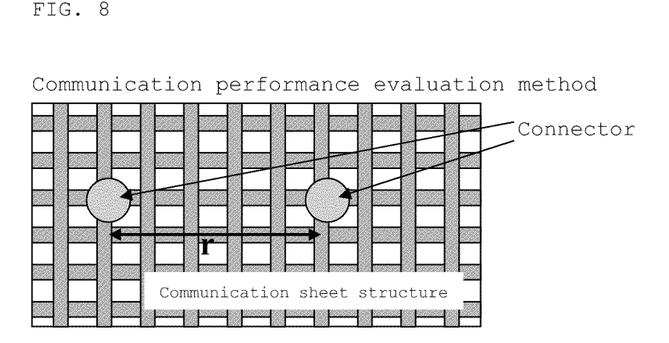
[FIG. 8] A front view of the communication sheet structure top layer for performing a communication performance evaluation method of the invention.

As shown in FIG. 3, two adjacent connectors placed on the communication sheet structure are placed at a distance of only r away from each other, and the transmission coefficient X at 2.45 GHz is measured by means of a network analyzer manufactured by Agilent Co. Herein, the distance between adjacent connectors was set to 1 cm, and measured every 1 cm for from 10 cm to 100 cm. Further, for the used adjacent connectors, the one having a peak at 2.45 GHz with the communication sheet structure was used. The means value (Xav.) of the measured transmission coefficients X was calculated. Xav.≥−30 dB is extremely favorable as the communication performances.

(4) Wrinkle Evaluation Determination

The communication sheet structure was rolled to a size of 150 mm in diameter, and the changes in conditions inside the communication sheet structure were observed.

The case where no wrinkles occurred inside the communication sheet structure was rated as A, and the case where wrinkles occurred was rated as B.

Example 1

For the base material, a 2-mm thick low density polyethylene (PE) sheet (hard polyethylene sheet, manufactured by Shimonoseki Packing Co., Ltd., the same shall apply hereinafter) was used. As the conductor A, 9-μm aluminum foil stamped in a lattice form was laminated on one side of the base material. The lattice shape of the conductor A was such that the line width was 1 mm and the line spacing was 7 mm. As the conductor B, on the other side of the base material, 9-μm aluminum foil was laminated so as to cover the entire surface, to manufacture a communication sheet structure. The results are shown in Table 1.

Example 2

For the base material, a 2-mm thick low density PE sheet was used. As the conductor A, aluminum was evaporated so as to be 350 angstroms in thickness on one side of the base material. The lattice shape of the conductor A was such that the line width was 1 mm and the line spacing was 7 mm. For evaporation, masking was performed so that the evaporating portion was in a lattice form, and then, evaporation was performed. As the conductor B, on the other side of the base material, aluminum was evaporated so as to be 350 angstroms in thickness, to manufacture a communication sheet structure. The results are shown in Table 1.

Example 3

For the base material, a 2-mm thick low density PE sheet was used. As the conductor A, a silver paste (conductive paste DW-351H-30 manufactured by TOYOBO Co., Ltd., the same shall apply hereinafter) was printed in a lattice form so as to be 20 μm in thickness on one side of the base material. The lattice shape of the conductor A was such that the line width was 1 mm and the line spacing was 7 mm. As the conductor B, on the entire surface on the other side of the base material, a 20-μm thick silver paste was printed, to manufacture a communication sheet structure. The results are shown in Table 1.

Example 4

For the base material, a 2-mm thick Teflon sheet (Teflon plate manufactured by Shimonoseki Packing Co., Ltd.,) was used. As the conductor A, 9-μm aluminum foil stamped in a lattice form was laminated on one side of the base material. The lattice shape of the conductor A was such that the line width was 1 mm and the line spacing was 7 mm. As the conductor B, on the other side of the base material, 9-μm aluminum foil was laminated so as to cover the entire surface, to manufacture a communication sheet structure. The results are shown in Table 1.

Example 5

A communication sheet structure was manufactured in the same manner as in Example 1. Then, on the top sides of the conductor A and the conductor B, 250-μm polyethylene terephthalate (PET) films (Tetoron films SL, manufactured by Teijin DuPont Films Japan Limited, the same shall apply hereinafter) were bonded as protective layers. For bonding, an acrylic adhesive ("Quickmaster SPS-945T" manufactured by DIC Corporation) was used. The layer including the protective layer A and the conductor A combined therein and the base material were bonded by means of a calendering machine. Finally, the layer including the protective layer B and the conductor B combined therein were bonded by means of a calendering machine, thereby to manufacture a communication sheet structure. The results are shown in Table 1.

Example 6

As the protective layer A and the conductor A, 9-μm aluminum foil was laminated on a 250-μm PET film. Then, a lattice-like etched aluminum foil-laminated film was obtained. The lattice shape of the conductor A was such that the line width was 1 mm and the line spacing was 7 mm. For the base material, 2-mm thick low density polyethylene was used. As the conductor B and the protective layer B, 9-μm aluminum foil was laminated on a 250-μm PET film, resulting in an aluminum foil-laminated film, the entire surface of which was covered with the conductor B. On the opposite sides of the base material, an acrylic adhesive was coated so as to be 10 g/m² in deposition amount per side by means of a table coater. Then, the layer including the protective layer A and the conductor A combined therein and the base material were bonded by means of a calendering machine. Finally, the layer including the protective layer B and the conductor B combined therein were bonded by means of a calendering machine, thereby to manufacture a communication sheet structure. For bonding, the aluminum side was caused to be bonded. The results are shown in Table 1.

Example 7

The same procedure was followed as in Example 5, except that, for the base material, a PET nonwoven fabric with a thickness of 2 mm, and a weight per unit of 72 g/m² (needle punch nonwoven fabric manufactured by OTSUKA Co., Ltd.) was used in place of the low density PE sheet.

Example 8

As the protective layer A and the conductor A, a silver paste was printed in a lattice form on a PET fiber woven fabric obtained by laminating an urethane resin on a PET fiber woven fabric ("New Shelf II" manufactured by Kawashima Selkon Textiles Co., Ltd.), resulting in a PET fiber woven fabric with a weight per unit of 200 g/m². For the base material, a PET fiber nonwoven fabric with a thickness of 2 mm, and a weight per unit of 72 g/m² was used. As the conductor B, a copper-/nickel-plated electromagnetic shield cloth with a weight per unit of 85 g/m² ("ST2050" manufactured by Teijin Fibers Limited, the same shall apply hereinafter) was used. The lattice shape of the conductor A was such that the line width was 1 mm and the line spacing was 7 mm. These were bonded together by sewing using a polyester machine sewing thread. Sewing was carried out using a lockstich machine table of DDL-5530 manufactured by JUKI with a seam length as 3 cm/13 stitches by means of a sewing machine needle DBX1#14. The results are shown in Table 1.

Example 9

The same procedure was followed as in Example 8, except that, for the base material, a nonwoven fabric including a hollow PET fiber (Aerotop manufactured by Teijin Fibers Limited) was used in place of the PET fiber nonwoven fabric. The results are shown in Table 1.

TABLE 1

|  | Example | | | | |
|---|---|---|---|---|---|
|  | 1 | 2 | 3 | 4 | 5 |
| Conductor electric resistance value (Ω/) | 0.06 | 0.9 | 0.3 | 0.06 | 0.06 |
| Protective layer A | — | — | — | — | PET film |
| Conductor A | Aluminum foil | Aluminum evaporation | Silver paste | Aluminum foil | Aluminum foil |
| Base material | Low density PE sheet | Low density PE sheet | Low density PE sheet | Teflon sheet | Low density PE sheet |
| Relative dielectric constant | 2.3 | 2.3 | 2.3 | 2.0 | 2.3 |
| Conductor B | Aluminum foil | Aluminum evaporation | Silver paste | Aluminum foil | Aluminum foil |
| Protective layer B | — | — | — | — | PET film |
| Conductor electric resistance value (Ω/) | 0.01 | 0.9 | 0.3 | 0.01 | 0.01 |
| Xav. (dB) | −22 | −30 | −28 | −20 | −22 |
| Wrinkle evaluation | A | A | A | A | B |

|  | Example | | | |
|---|---|---|---|---|
|  | 6 | 7 | 8 | 9 |
| Conductor electric resistance value (Ω/) | 0.06 | 0.06 | 0.3 | 0.3 |
| Protective layer A | PET film | PET film | PET fiber woven fabric | PET fiber woven fabric |
| Conductor A | Aluminum foil (formed on protective layer) | Aluminum foil | Silver paste (formed on protective layer) | Silver paste (formed on protective layer) |
| Base material | Low density PE sheet | PET fiber nonwoven fabric (needle punch nonwoven fabric) | PET fiber nonwoven fabric (needle punch nonwoven fabric) | Hollow PET fiber nonwoven fabric (needle punch nonwoven fabric) |
| Relative dielectric constant | 2.3 | 1.8 | 1.8 | 1.5 |
| Conductor B | Aluminum foil (formed on protective layer) | Aluminum foil | Copper-nickel | Copper-nickel |
| Protective layer B | PET film | PET film | — | — |
| Conductor electric resistance value (Ω/) | 0.01 | 0.01 | 0.03 | 0.03 |
| Xav. (dB) | −22 | −21 | −27 | −23 |
| Wrinkle evaluation | B | B | B | B |

Example 10

The same procedure was followed as in Example 8, except that, for the base material, a nonwoven fabric including a triangular cross-section PET fiber (ESCUSA manufactured by Teijin Fibers Limited) was used in place of the PET fiber nonwoven fabric. The results are shown in Table 2.

Example 11

The same procedure was followed as in Example 8, except that, for the protective layer, a PET fiber high density woven fabric was used in place of the PET fiber woven fabric. As the PET fiber high density woven fabric, there was used a woven fabric with finenesses of 48 dtex for the warp and 48 dtex for the weft, woven fabric densities of 110 yarns/inch in warp density and 92 yarns/inch in weft density, and a cover factor of 1394. The results are shown in Table 2.

Example 12

For the base material, there was used a 2-mm thick olefin elastomer sheet (ESPOLEX TPE manufactured by Sumitomo Chemical Co., Ltd.). As the conductor A, a silver paste was printed in a lattice form so as to be 20 μm in thickness on one side of the base material. The lattice shape of the conductor A was such that the line width was 1 mm and the line spacing was 7 mm. As the conductor B, a 20-μm silver paste was printed over the entire surface on the other side of the base material. Then, on opposite sides of the base material, as protective layers, an urethane resin (U-1468, manufactured by Seikoh Chemicals Co., Ltd.) was coated so as to be 10 μm in coating thickness. The results are shown in Table 2.

Example 13

The same procedure was followed as in Example 12, except that a 1-mm thick olefin elastomer sheet (ESPOLEX TPE manufactured by Sumitomo Chemical Co., Ltd.) was used in place of the urethane resin for the protective layers A and B. The results are shown in Table 2.

Example 14

The same procedure was followed as in Example 13, except that as the base material, a 2-mm thick ester elastomer sheet (ESPRENE SPO manufactured by Sumitomo Chemical Co., Ltd.) was used in place of the olefin elastomer sheet, and as the protective layers A and B, a 1-mm thick ester elastomer sheet (ESPRENE SPO manufactured by Sumitomo Chemical Co., Ltd.) was used in place of the olefin elastomer sheet. The results are shown in Table 2.

Example 15

The same procedure was followed as in Example 8, except that as the base material, a nonwoven fabric including a polyether ester fiber (REXE manufactured by Teijin Fibers Limited) was used in place of the PET fiber nonwoven fabric. The results are shown in Table 2.

Example 16

The same procedure was followed as in Example 8, except that as the base material, a PET fiber nonwoven fabric in which the number of staple fibers oriented in the thickness direction is larger than the number of staple fibers oriented in the planar direction (V-LAP nonwoven fabric manufactured by Teijin Fibers Limited) was used in place of the PET fiber nonwoven fabric. The results are shown in Table 2.

TABLE 2

| | Example | | | |
|---|---|---|---|---|
| | 10 | 11 | 12 | 13 |
| Conductor electric resistance value (Ω/) | 0.3 | 0.3 | 0.3 | 0.3 |
| Protective layer A | PET fiber woven fabric | PET fiber high density woven fabric | Urethane resin | Olefin elastomer resin |
| Conductor A | Silver paste (formed on protective layer) | Silver paste (formed on protective layer) | Silver paste | Silver paste |
| Base material | PET triangular cross-section fiber nonwoven fabric | PET fiber nonwoven fabric (needle punch nonwoven fabric) | Olefin elastomer sheet | Olefin elastomer sheet |
| Relative dielectric constant | 1.5 | 1.8 | 2.3 | 2.3 |
| Conductor B | Copper-nickel | Copper-nickel | Silver paste | Silver paste |
| Protective layer B | — | — | Urethane resin | Olefin elastomer resin |
| Conductor electric resistance value (Ω/) | 0.03 | 0.03 | 0.3 | 0.3 |
| Xav. (dB) | −24 | −23 | −24 | −24 |
| Wrinkle evaluation | B | B | A | A |

| | Example | | |
|---|---|---|---|
| | 14 | 15 | 16 |
| Conductor electric resistance value (Ω/) | 0.3 | 0.3 | 0.3 |
| Protective layer A | Ester elastomer resin | PET fiber woven fabric | PET fiber woven fabric |
| Conductor A | Silver paste | Silver paste (formed on protective layer) | Silver paste (formed on protective layer) |

TABLE 2-continued

|  | Base material | Ester elastomer sheet | Polyether ester fiber nonwoven fabric | PET fiber nonwoven fabric (nonwoven fabric in which a large number of staple fibers are oriented in the thickness direction) |
|---|---|---|---|---|
|  | Relative dielectric constant | 3.0 | 1.8 | 1.6 |
|  | Conductor B | Silver paste | Copper-nickel | Copper-nickel |
|  | Protective layer B | Ester elastomer resin | — | — |
|  | Conductor electric resistance value (Ω/) | 0.3 | 0.03 | 0.03 |
|  | Xav. (dB) | −26 | −22 | −23 |
|  | Wrinkle evaluation | A | A | A |

INDUSTRIAL APPLICABILITY

A communication sheet structure of the present invention is capable of communication in two dimensions at a frequency band of from 800 MHz to 10 GHz in frequency, and not only can be set on a top of a desk in a conference room or one's own room in an office for use, but also can be set on a commodity shelf for use in inventory control and physical distribution management, or can be set over the entire wall surface or the entire floor surface for use as a sensor sheet.

DETAILED DESCRIPTION OF THE DRAWINGS

The invention claimed is:

1. A communication sheet structure for transmitting electromagnetic waves, and thereby performing communication, characterized in that the communication sheet structure comprises a planar base material with a relative dielectric constant at a frequency of from 800 MHz to 10 GHz of from 1.0 to 15.0, and one side of the base material includes conductor A existing portion and non-existing portion, and the other side of the base material includes a conductor B existing over 90% or more thereof, wherein the conductor A existing portion surrounds the conductor A non existing portion.

2. The communication sheet structure according to claim 1, wherein the electric resistance values of the conductor A and the conductor B are 5 Ω/□ or less.

3. The communication sheet structure according to claim 1, wherein the conductor A is disposed in a lattice.

4. The communication sheet structure according to claim 3, wherein the line width of the lattice is from 0.5 mm to 5.0 mm, and the line spacing is from 3 mm to 50 mm.

5. The communication sheet structure according to claim 1, wherein the base material comprises a fiber structure.

6. The communication sheet structure according to claim 5, wherein the fiber structure is a nonwoven fabric in which the number of fibers oriented in the thickness direction is larger than the number of fibers oriented in the planar direction.

7. The communication sheet structure according to claim 5, wherein the fiber forming the fiber structure is a modified cross-section fiber.

8. The communication sheet structure according to claim 1, wherein the base material is an elastomer resin or an elastomer fiber structure.

9. The communication sheet structure according to claim 1, wherein the conductor A and the base material are covered with a protective layer A, or at least the conductor B is covered with a protective layer B.

10. The communication sheet structure according to claim 9, wherein the protective layer A or B is an elastomer resin or an elastomer fiber structure.

11. The communication sheet structure according to claim 9, wherein the protective layer A or B is a high density woven fabric with a cover factor of 1000 to 2500.

* * * * *